(12) United States Patent
Wong

(10) Patent No.: US 8,874,331 B2
(45) Date of Patent: Oct. 28, 2014

(54) METHOD AND APPARATUS FOR IDLE SPEED CONTROL BASED ON VARIABLE TORQUE CONVERTER LOAD

(75) Inventor: Gary Wong, Rancho Palos Verdes, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 110 days.

(21) Appl. No.: 13/108,155

(22) Filed: May 16, 2011

(65) Prior Publication Data

US 2012/0296535 A1 Nov. 22, 2012

(51) Int. Cl.
| | |
|---|---|
| F02D 11/10 | (2006.01) |
| F02D 41/02 | (2006.01) |
| F02D 31/00 | (2006.01) |
| F02D 41/00 | (2006.01) |
| F02D 41/08 | (2006.01) |

(52) U.S. Cl.
CPC ............ *F02D 41/0215* (2013.01); *F02D 11/10* (2013.01); *F02D 31/003* (2013.01); *F02D 41/0002* (2013.01); *F02D 41/08* (2013.01); F02D 2200/101 (2013.01); F02D 2400/12 (2013.01); Y02T 10/42 (2013.01)
USPC .......................... 701/54; 123/339.12; 123/337

(58) Field of Classification Search
USPC ................................ 701/54; 123/337, 119.12
See application file for complete search history.

(56) References Cited

U.S. PATENT DOCUMENTS

| | | | | |
|---|---|---|---|---|
| 4,107,776 A | * | 8/1978 | Beale ............................... | 701/99 |
| 5,235,946 A | * | 8/1993 | Fodale et al. ................. | 477/109 |
| 5,445,124 A | * | 8/1995 | Tomisawa et al. ........ | 123/339.11 |
| 5,590,630 A | | 1/1997 | Kurihara et al. | |
| 6,006,724 A | * | 12/1999 | Takahashi et al. ........ | 123/339.19 |
| 6,188,943 B1 | * | 2/2001 | Uchida et al. .................... | 701/54 |
| 6,367,446 B1 | * | 4/2002 | Kanamaru et al. ........ | 123/339.12 |
| 6,440,037 B2 | * | 8/2002 | Takagi et al. .................... | 477/37 |
| 6,478,713 B1 | * | 11/2002 | Runde et al. .................. | 477/107 |
| 6,516,778 B1 | * | 2/2003 | Light et al. ..................... | 123/352 |
| 6,561,938 B1 | | 5/2003 | Korner et al. | |
| 6,634,984 B1 | | 10/2003 | Doering et al. | |
| 6,655,350 B2 | * | 12/2003 | Kamoto .................... | 123/339.22 |
| 6,742,497 B1 | * | 6/2004 | Kanamaru et al. ........ | 123/339.11 |
| 6,799,108 B2 | | 9/2004 | Aldrich, III et al. | |
| 6,857,987 B2 | | 2/2005 | Aldrich, III et al. | |
| 6,874,467 B2 | * | 4/2005 | Hunt et al. ............... | 123/339.27 |
| 6,994,654 B2 | * | 2/2006 | Sakaguchi et al. ............ | 477/181 |
| 7,243,011 B2 | * | 7/2007 | Koenig et al. .................... | 701/22 |
| 7,246,001 B2 | | 7/2007 | Anderson et al. | |
| 7,320,307 B2 | * | 1/2008 | Trask et al. ................... | 123/435 |
| 7,380,447 B2 | * | 6/2008 | Rollinger et al. .......... | 73/114.32 |

(Continued)

*Primary Examiner* — John R Olszewski
*Assistant Examiner* — Jean-Paul Cass
(74) *Attorney, Agent, or Firm* — Snell & Wilmer LLP

(57) ABSTRACT

The present invention relates to a method and apparatus for idle speed control based on variable torque converter load. An automobile can include an idle throttle variation unit. The idle throttle variation unit can include, for example, a throttle, an engine, a torque converter, a transmission, multiple sensors, an engine control unit ("ECU"), and/or a memory. The multiple sensors can detect engine output speed data corresponding to engine output speed, and/or transmission output speed data corresponding to transmission input speed. The throttle can control airflow to the engine to match a target total airflow for a target idle engine speed. The ECU can determine the target total airflow for the throttle using a target total airflow table which includes target total airflow values corresponding to the engine output peed, the transmission input speed, and/or a torque converter speed ratio.

19 Claims, 10 Drawing Sheets

(56) References Cited

U.S. PATENT DOCUMENTS

| | | | |
|---|---|---|---|
| 7,415,872 B2* | 8/2008 | DeGeorge et al. | 73/146 |
| 7,415,967 B2* | 8/2008 | Trask et al. | 123/435 |
| 7,509,200 B2* | 3/2009 | Ito et al. | 701/51 |
| 7,785,229 B2 | 8/2010 | Maddock | |
| 8,141,358 B2* | 3/2012 | Kolmanovsky et al. | 60/605.1 |
| 2004/0025837 A1* | 2/2004 | Hunt et al. | 123/339.27 |
| 2004/0244770 A1* | 12/2004 | Surnilla et al. | 123/339.19 |
| 2005/0079953 A1* | 4/2005 | Zieles et al. | 477/185 |
| 2007/0125339 A1* | 6/2007 | Russell et al. | 123/361 |
| 2007/0295067 A1* | 12/2007 | Rollinger et al. | 73/118.2 |
| 2009/0098978 A1 | 4/2009 | Lee et al. | |
| 2009/0281696 A1 | 11/2009 | Wegeng et al. | |
| 2010/0170740 A1 | 7/2010 | Lochocki, Jr. et al. | |
| 2010/0274423 A1 | 10/2010 | Seel et al. | |

* cited by examiner

| BASE DATA | Fuelmeter Measurement Analysis | | |
|---|---|---|---|
| TEST | fuel (gal) | FE (mpg) | |
| @041411_AutomobileEPA 75_bag1 | 0.123 | 29.20 | |
| @041411_Automobile EPA 75_bag2 | 0.125 | 30.86 | |
| @041411_Automobile EPA 75_bag3 | 0.106 | 33.51 | |
| 041411 combined FTP75 | 0.238 | 31.17 | |
| @041511_Automobile EPA 75_bag1 | 0.121 | 29.45 | |
| @041511_Automobile EPA 75_bag2 | 0.126 | 30.51 | |
| @041511_Automobile EPA75_bag3 | 0.106 | 33.82 | |
| 041511 Combined FTP75 | 0.239 | 31.11 | |
| @041411_Automobile HWFET | 0.454 | 44.87 | |
| @041511_Automobile HWFET | 0.462 | 44.06 | |
| @041411_Automobile US 06 | 0.560 | 28.40 | |
| @041511_Automobile US 06 | 0.559 | 28.48 | |
| NEW LOGIC DATA | | | |
| TEST | fuel (gal) | FE (mpg) | Fuelmeter FE Improvements (%) |
| @041911_ Automobile EPA75_bag1 | 0.119 | 29.93 | 2.06% |
| @041911_ Automobile EPA75_bag2 | 0.124 | 31.12 | 1.43% |
| @041911_ Automobile EPA75_ bag3 | 0.105 | 34.12 | 1.38% |
| 041911 Combined FTP75 | 0.235 | 31.63 | 1.56% |
| @042011_ Automobile EPA75_bag1 | 0.119 | 30.14 | 2.79% |
| @042011_ Automobile EPA75_bag2 | 0.122 | 31.60 | 2.98% |
| @042011_ Automobile EPA75_bag3 | 0.104 | 34.32 | 1.97% |
| 042011 Combined FTP75 | 0.232 | 31.96 | 2.68% |
| @041911_ Automobile HWFET | 0.456 | 44.62 | 0.36% |
| @042011_ Automobile HWFET | 0.461 | 44.12 | -0.76% |
| @041911_ Automobile US 06 | 0.554 | 28.72 | 0.96% |
| @042011_ Automobile US 06 | 0.559 | 28.45 | 0.02% |

Fuel Flow Meter Analysis

FIG. 6

METHOD AND APPARATUS FOR IDLE SPEED CONTROL BASED ON VARIABLE TORQUE CONVERTER LOAD

BACKGROUND

1. Field

The present invention relates to a method and apparatus for idle speed control based on variable torque converter load.

2. Description of the Related Art

A conventional automobile has an engine which remains operative, even when a gas pedal is not depressed. That is, the engine operates at a target idle engine speed. This is because the engine needs to keep running at a certain level to prevent the engine from stalling, and also to provide energy to accessory devices in the automobile which may require energy to function. To keep the engine running, a throttle allows a certain amount of airflow to enter the engine so that the engine can use the airflow to combust fuel. Control of the airflow results in control of the operational conditions of the engine.

Conventionally, the amount of airflow allowed to operate the engine at a target idle speed is set by the manufacturer and not adjusted or capable of adjustment. Such airflow to prevent the engine from stalling and idle at the target speed was combined with the airflow required to compensate for the energy required from the accessory devices in the automobile. However, this did not take into account the fact that the amount of airflow required to operate the engine at a target idle speed can vary with a number of conditions, including vehicle speed. For example, as an automobile goes into motion, the resistance from a torque converter can decrease to zero. That is, under certain conditions, the engine encounters little resistance when operating, needs to combust less fuel to overcome the resistance, and thus requires very little airflow.

Without taking into account such diverse situations for operating the engine, too much airflow is sometimes supplied to the engine. This results in the engine combusting more fuel than necessary to operate at the target idle speed. Since fuel economy for an automobile is one of the major considerations for an automobile purchase, this can reduce the conventional automobile's competitiveness in the marketplace. Furthermore, since government regulations for fuel economy has increasingly become tighter, this fuel inefficiency can also cause design problems.

Also, the consumption of more fuel can also directly affect an amount of emissions from the conventional automobile, which again can reduce the conventional automobile's competitiveness in the marketplace and may also cause design problems. From a national standpoint, increased fuel consumption may be undesirable for many reasons, some of which relate to national security and also environmental protection.

Thus, there is a need for a method and apparatus for idle speed control based on variable torque converter load.

SUMMARY

The present invention relates to a method and apparatus for idle speed control based on variable torque converter load. According to an embodiment of the present invention, an automobile can include an idle throttle variation unit. The idle throttle variation unit can include, for example, a throttle, an engine, a torque converter, a transmission, multiple sensors, an engine control unit ("ECU"), and/or a memory. The multiple sensors can include, for example, an engine sensor configured to detect engine output speed data corresponding to engine output speed, and/or a transmission sensor configured to detect transmission output speed data corresponding to transmission input speed. The throttle can control airflow to the engine to match a target total airflow for a target idle engine speed. To control the airflow, the throttle can vary a position of a throttle valve.

The ECU can determine the target total airflow for the throttle using a target total airflow table which includes target total airflow values corresponding to the engine output speed, the transmission input speed, and/or a torque converter speed ratio. The torque converter speed ratio can be, for example, an output speed of the torque converter divided by an input speed of the torque converter. The output speed of the torque converter can be equivalent, for example, to an input speed of the transmission, while the input speed of the torque converter can be equivalent, for example, to an output speed of the engine. Thus, the torque converter speed ratio can be, for example, the output speed of the engine. As the torque converter speed ratio approaches 1, the target total airflow values can be reduced.

The reduction in target total airflow values reduces fuel consumption by the automobile since less fuel is combusted. Furthermore, the reduction in fuel consumption also reduces emissions of the automobile, which can lead to reduced costs associated with complying with governmental regulations. This can improve the attractiveness of the automobile to consumers due to its increased fuel economy and possibly lower cost.

In one embodiment, the present invention is an idle throttle variation unit including an engine control unit configured to be connected to a throttle and configured to receive engine output speed data and transmission input speed data, and to determine a target total airflow by the throttle for a target idle engine speed based on the engine output speed data and the transmission input speed data.

In another embodiment, the present invention is an automobile including an engine having an engine output speed, an engine sensor detecting the engine output speed data corresponding to the engine output speed, and configured to output the engine output speed data, a throttle controlling a total airflow to the engine based on a target total airflow, a transmission having a transmission input speed, a transmission sensor detecting the transmission input speed data corresponding to the transmission input speed, and configured to output the transmission input speed data, and an engine control unit configured to be connected to the throttle and configured to receive the engine output speed data and the transmission input speed data, and to determine the target total airflow by the throttle for a target idle engine speed based on the engine output speed data and the transmission input speed data.

In yet another embodiment, the present invention is a method for idle throttle variation including receiving engine output speed data, receiving transmission input speed data, and determining a target total airflow by a throttle for a target idle engine speed, using an engine control unit, based on the engine output speed data and the transmission input speed data.

BRIEF DESCRIPTION OF THE DRAWINGS

The features, obstacles, and advantages of the present invention will become more apparent from the detailed description set forth below when taken in conjunction with the drawings, wherein:

FIG. 6 is a table containing data for fuel efficiency tests according to an embodiment of the present invention;

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
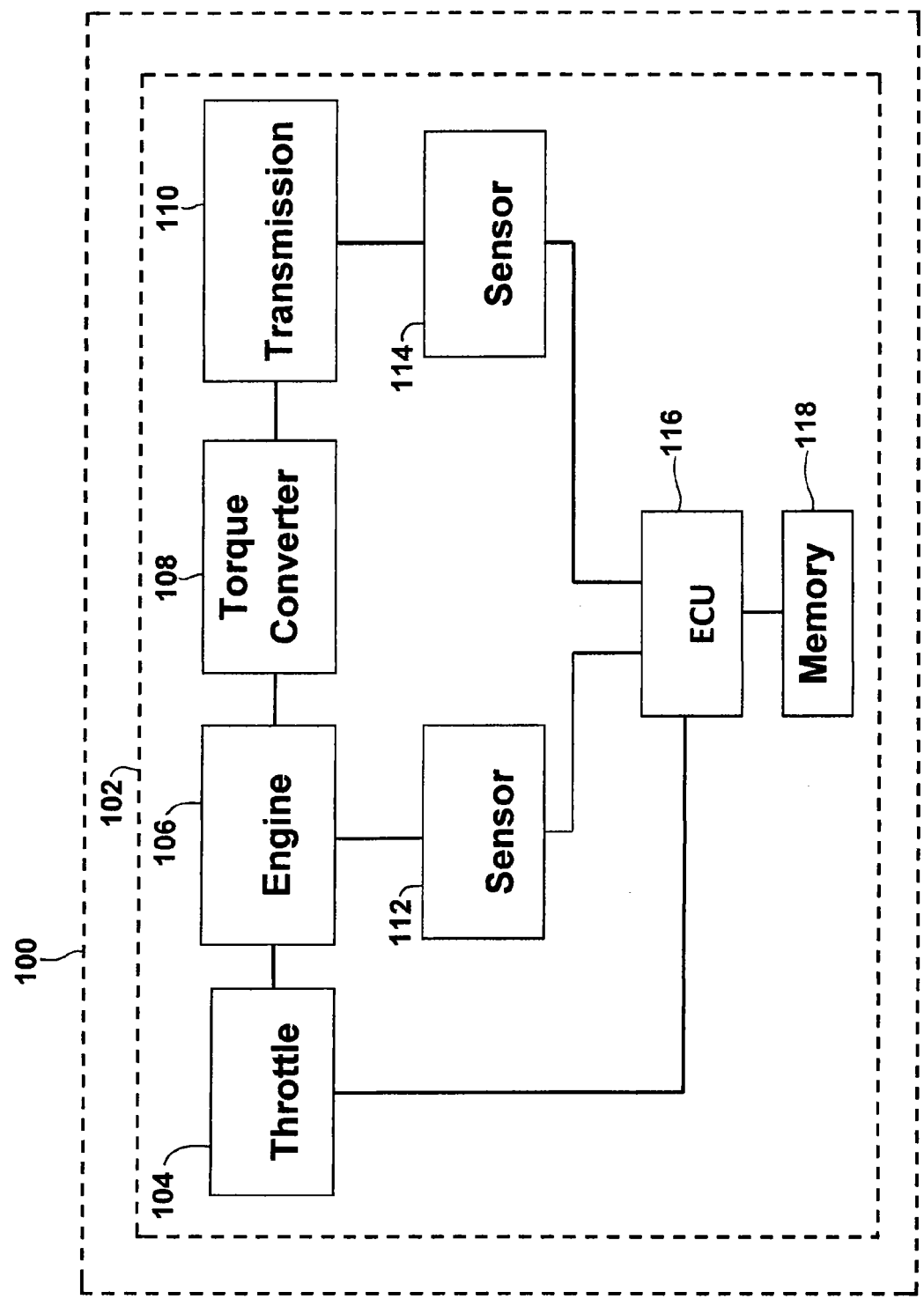
FIG. 1 is a block diagram of an automobile including an idle throttle variation unit according to an embodiment of the present invention.

FIG. 1 depicts, for example, a block diagram representation of an automobile 100 according to an embodiment of the present invention. As seen in FIG. 1, the automobile 100 includes, for example, an idle throttle variation unit 102. The idle throttle variation unit 102 can include, for example, a throttle 104, an engine 106, a torque converter 108, a transmission 110, a sensor 112, a sensor 114, an engine control unit ("ECU") 116, and/or a memory 118.

The throttle 104 can be connected, for example, to the engine 106. The throttle 104 can optionally include, for example, a virtual throttle, and/or a throttle valve. The throttle 104 controls airflow to the engine 106 to be used for the combustion of fuel in the engine 106. To control the airflow to the engine 106, the throttle can vary, for example, a position of the throttle valve. In one embodiment, the airflow allowed to the engine 106 for a target idle engine speed by the throttle 104 can be, for example, a target total airflow. The target idle engine speed can be, for example, a desired engine speed when the engine 106 is idle. The target total airflow and/or the operations of the throttle 104 can be controlled, for example, by the ECU 116, which will be described later.

The engine 106 can be connected, for example, to the throttle 104, the torque converter 108, and/or the sensor 112. The engine 106 can be, for example, an internal combustion engine. The engine 106 can be used to move the automobile 100 when it combusts, for example, fuel using airflow supplied by the throttle 104. The engine 106 can have, for example, an engine output speed. When engaged with torque converter 108, the engine 106 can be used to drive an impeller in the torque converter 108 and drive fluid in the torque converter 108. In one embodiment, the engine output torque should be sufficient to overcome the hydrodynamic resistance of the fluid in the torque converter 108.

The torque converter 108 is connected, for example, to the engine 106 and/or the transmission 110. The torque converter 108 allows energy transfer from the engine 106 to the transmission 110 and can be, for example, a fluid coupling between the engine 106 and/or the transmission 110. The engine output speed, a transmission input speed, and/or a torque converter speed ratio can indicate, for example, an amount of hydrodynamic resistance provided by the fluid in the torque converter 108. In one embodiment, the engine output speed can be, for example, an actual output speed of the engine or a target output speed of the engine.

The torque converter speed ratio is equal to a torque converter output speed divided by a torque converter input speed. The torque converter output speed is equivalent to the transmission input speed, while the torque converter input speed is equivalent to the engine output speed. Thus, the torque converter speed ratio is equal to the transmission input speed divided by the engine output speed, which can be determined, for example, by the ECU 118. The torque converter 108 can have an impeller rotated by the engine 106 and a turbine connected to the transmission 110. The turbine can be rotated by movement of the fluid by the engine 106, and/or the transmission 110.

The transmission 110 is connected, for example, to the torque converter 108 and/or the sensor 114. The transmission 110 can translate the force from the engine 106 to wheels of the automobile 100 (not shown) to move the automobile 100. The transmission 110 can have a transmission input speed corresponding to the rotation of the turbine in torque converter 108.

The sensor 112 is configured to detect an engine output speed of the engine 106 as engine output speed data. In one embodiment, the sensor 112 is an engine output sensor. The sensor 112 can optionally be connected to the engine 106. The sensor 112 can transmit the engine output speed data to the ECU 116. Similarly, the sensor 114 is configured to detect a transmission input speed of the transmission 110 as transmission input speed data. The sensor 114 can optionally be connected to the transmission 110. The sensor 114 can transmit the transmission input speed data to the ECU 116. The data transmission by the sensor 112 and/or the sensor 114 can be performed, for example, through a wired connection or a wireless connection.

The ECU 116 is connected to the throttle 104, the sensor 112, the sensor 114, and/or the memory 118. The ECU 116 can control, for example, an operation of the throttle 104. That is, the ECU 116 can control, for example, a position of the throttle valve in the throttle 104 and/or an amount of airflow provided by the throttle 104 to the engine 106. Furthermore, the ECU 116 can determine the target total airflow amount. The target total airflow amount can also be used to determine a position of the throttle valve and/or the amount of airflow provided by the throttle 104.

The target total airflow amount can correspond, for example, to the engine output speed indicated by the engine output speed data, the transmission input speed indicated by the transmission input speed data, and/or the torque converter speed. Generally, as the transmission input speed approaches the engine output speed, the hydrodynamic resistance of the fluid in the torque converter is reduced.

Figure 2:
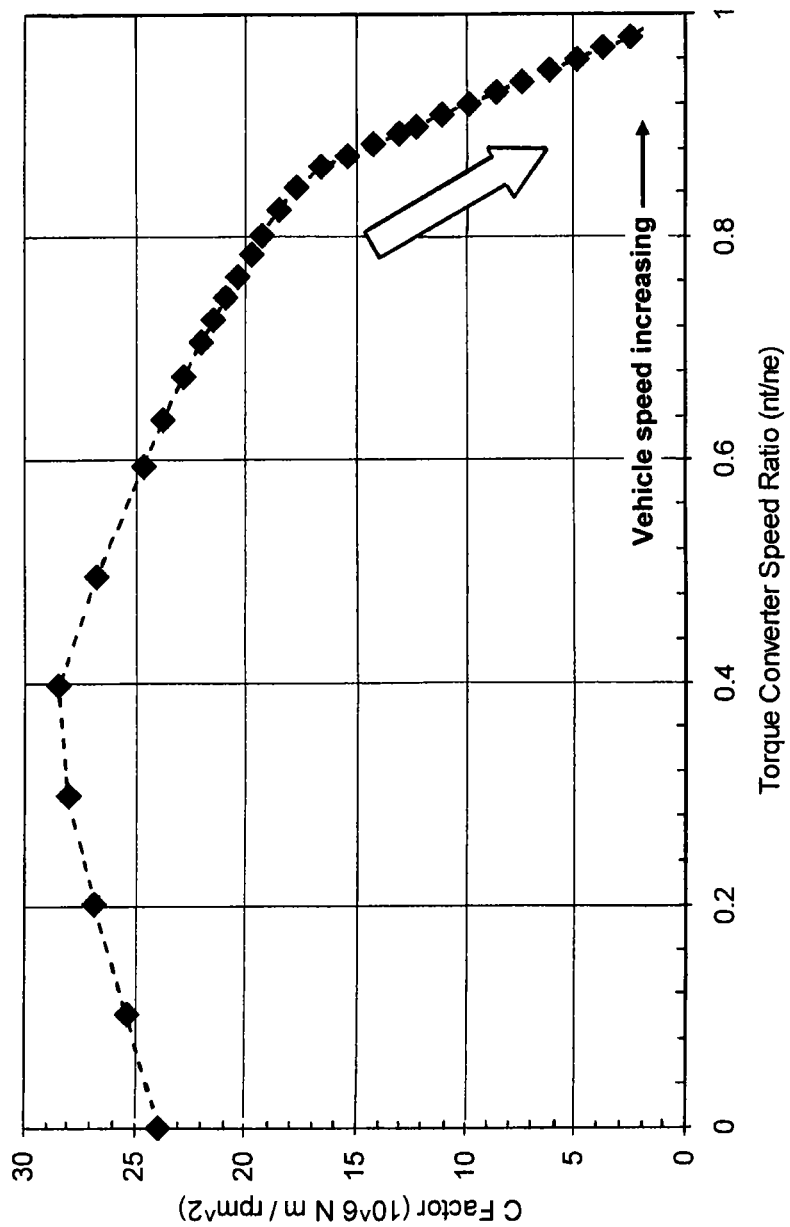
FIG. 2 is a graph of hydrodynamic load compared with a torque converter speed ratio according to an embodiment of the present invention.

This can be seen, for example, in FIG. 2. As the vehicle speed increases, the torque converter speed ratio increases. As the torque converter speed ratio approaches 1, when the transmission input speed approaches the engine output speed, the C factor approaches 0. The C factor measures, for example, the hydrodynamic load of the fluid in the torque converter 108. Thus, as the torque converter speed ratio approaches 1, when the transmission input speed approaches the engine output speed, the hydrodynamic load of the fluid in the torque converter 108 decreases and approaches 0.

Therefore, the engine 106 does not need to output as much energy to the impeller in order to overcome the resistance of the fluid and prevent the engine 106 from stalling when the transmission input speed approaches the engine output speed. Thus, by utilizing the engine output speed indicated by the engine output speed data, the transmission input speed indicated by the transmission input speed data, and/or the torque converter speed, the target total airflow can be reduced. The reduction of the target total airflow can reduce an amount of fuel consumed by the engine 106 and/or reduce an amount of emissions in the air.

Since a conventional automobile does not take into account the reduced hydrodynamic load when determining the target total airflow, the conventional automobile will have a greater target total airflow and consume greater fuel.

In one embodiment, the ECU 116 can determine the target total airflow using a target total airflow table stored, for example, in the memory 118. In one embodiment, the target total airflow table can indicate, for example, the target total airflow taking into account any energy load requirements which require the engine 106 to operate at higher speeds, the engine output speed, and/or the transmission input speed. The energy load requirements can be, for example, operation of an air conditioning unit, operation of a radio, operation of headlights, operation of windshield wipers, operation of multimedia systems, and/or operation of any other equipment which requires energy to be generated from the engine 106.

In another embodiment, the target total airflow table can indicate, for example, the target total airflow taking into account any energy load requirements which require the engine 106 to operate at higher speeds, and/or the torque converter speed ratio.

Figure 3:
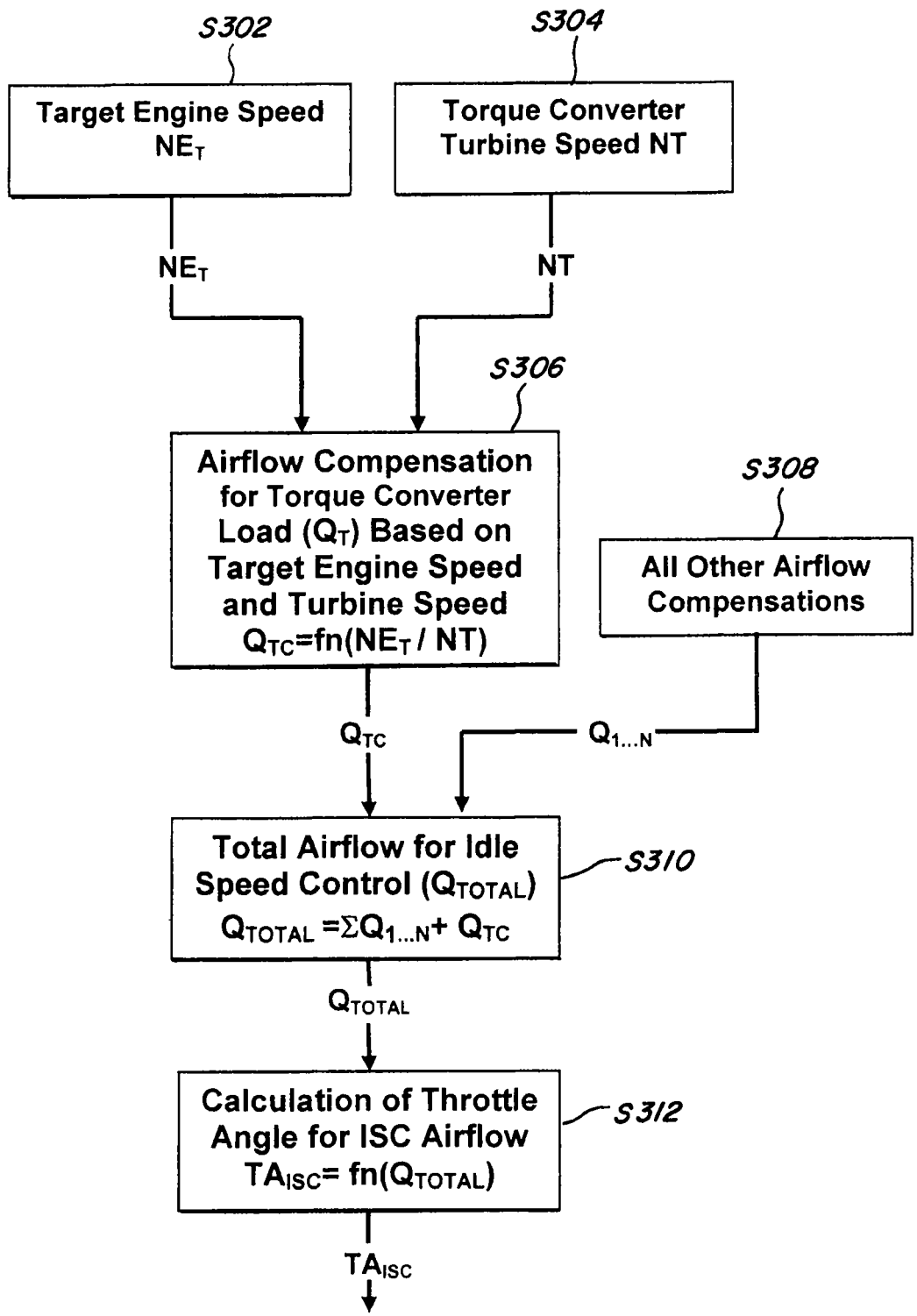
FIG. 3 depicts a process according to an embodiment of the present invention.

Thus, in one embodiment, the ECU 116 does not need to calculate the torque converter speed ratio in order to determine the target total airflow. For example, as seen in FIG. 3, in Step S302, a target engine speed $NE_T$ is determined. The target engine speed can be, for example, the engine output speed. The engine output speed can be equivalent to the target idle engine speed. In Step S304, a torque converter turbine speed NT is calculated. The torque converter turbine speed can be, for example, the transmission input speed.

In Step S306, airflow compensation for torque converter load ($Q_T$) based on the target engine speed and the turbine speed can be calculated using the formula $Q_{TC}=\text{fn}(NE_T/NT)$. That is, the airflow required to overcome the hydrodynamic load is calculated using the engine output speed and/or the transmission input speed as $Q_{TC}$. Such information can be contained, for example, in a target total airflow table.

In Step S308, all other airflow compensations are calculated. For example, the airflow compensation required to power other electronic devices are calculated as $Q_1 \ldots Q_N$. In Step S310, a total airflow for idle speed control ($Q_{TOTAL}$) is calculated using the formula $Q_{TOTAL}=\Sigma Q_{1\ldots N}+Q_{TC}$. The total airflow for idle speed control can be, for example, a target total airflow for a target idle engine speed. In Step S312, the throttle angle can be calculated for idle speed control airflow using the equation $TA_{ISC}=\text{fn}(Q_{TOTAL})$ where $TA_{ISC}$ is the throttle angle.

Figure 4:
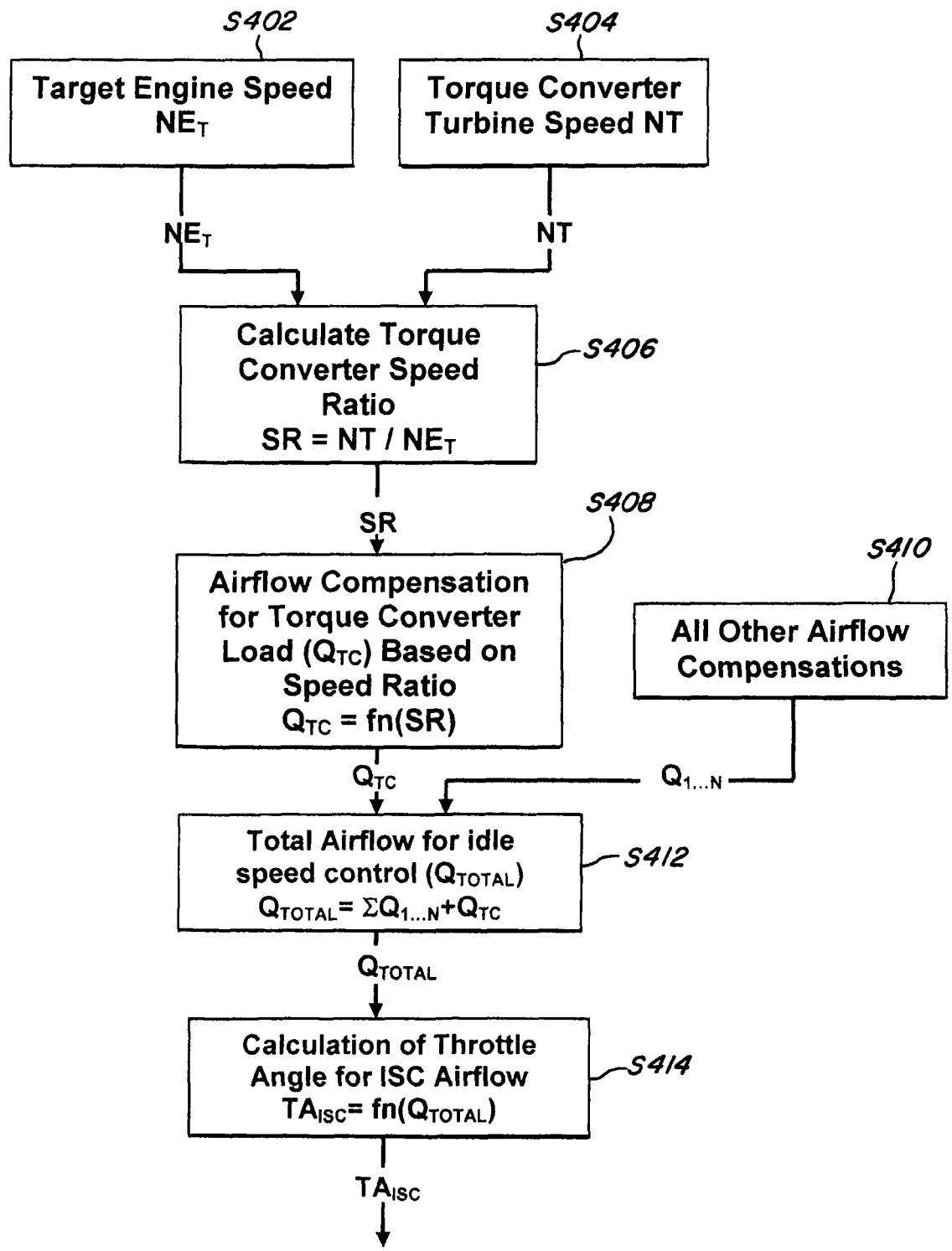
FIG. 4 depicts a process a according to an embodiment of the present invention.

The steps in FIG. 4 are similar to the steps in FIG. 3, except that the torque converter speed ratio is calculated and the torque converter load is determined using the torque converter speed ratio. For example, in Step S406, the torque converter speed ratio is calculated using $SR=NT/NE_T$, where SR is the torque converter speed ratio. Furthermore, in Step S408, the airflow compensation for the torque converter load ($Q_{TC}$) is now calculated based on the torque converter speed ratio using the equation $Q_{TC}=\text{fn}(SR)$. Such information can be contained, for example, in a target total airflow table.

Figure 5:
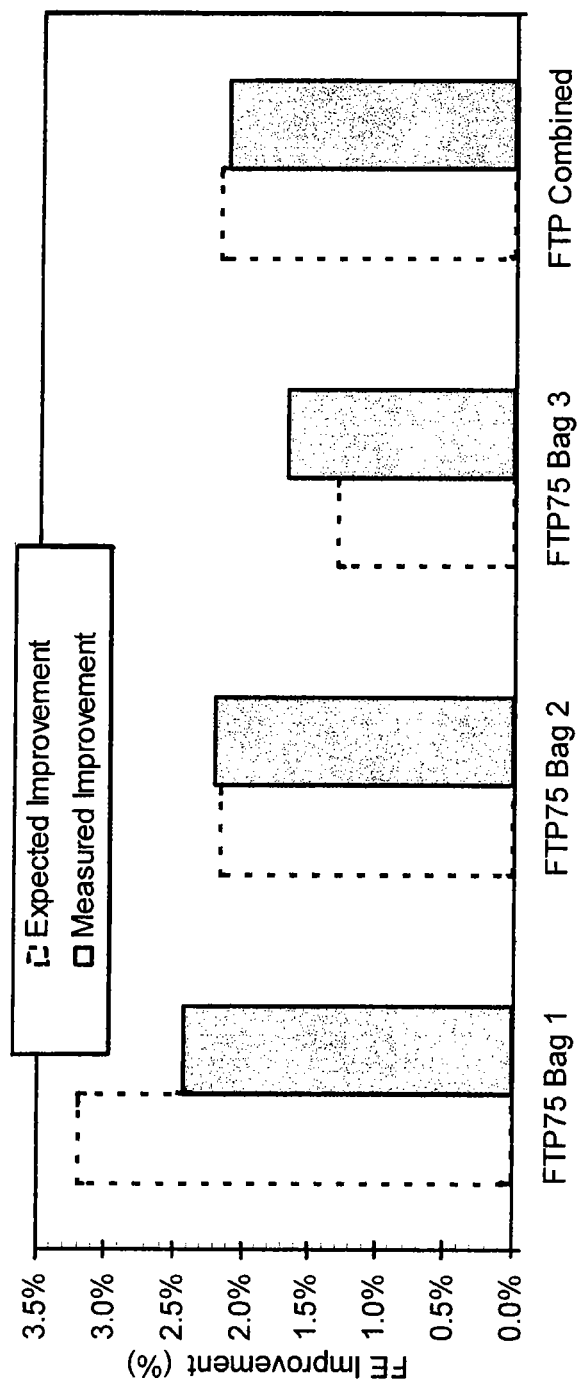
FIG. 5 is a graph of expected and actual fuel efficiency for sample tests according to an embodiment of the present invention.
Figure 7:
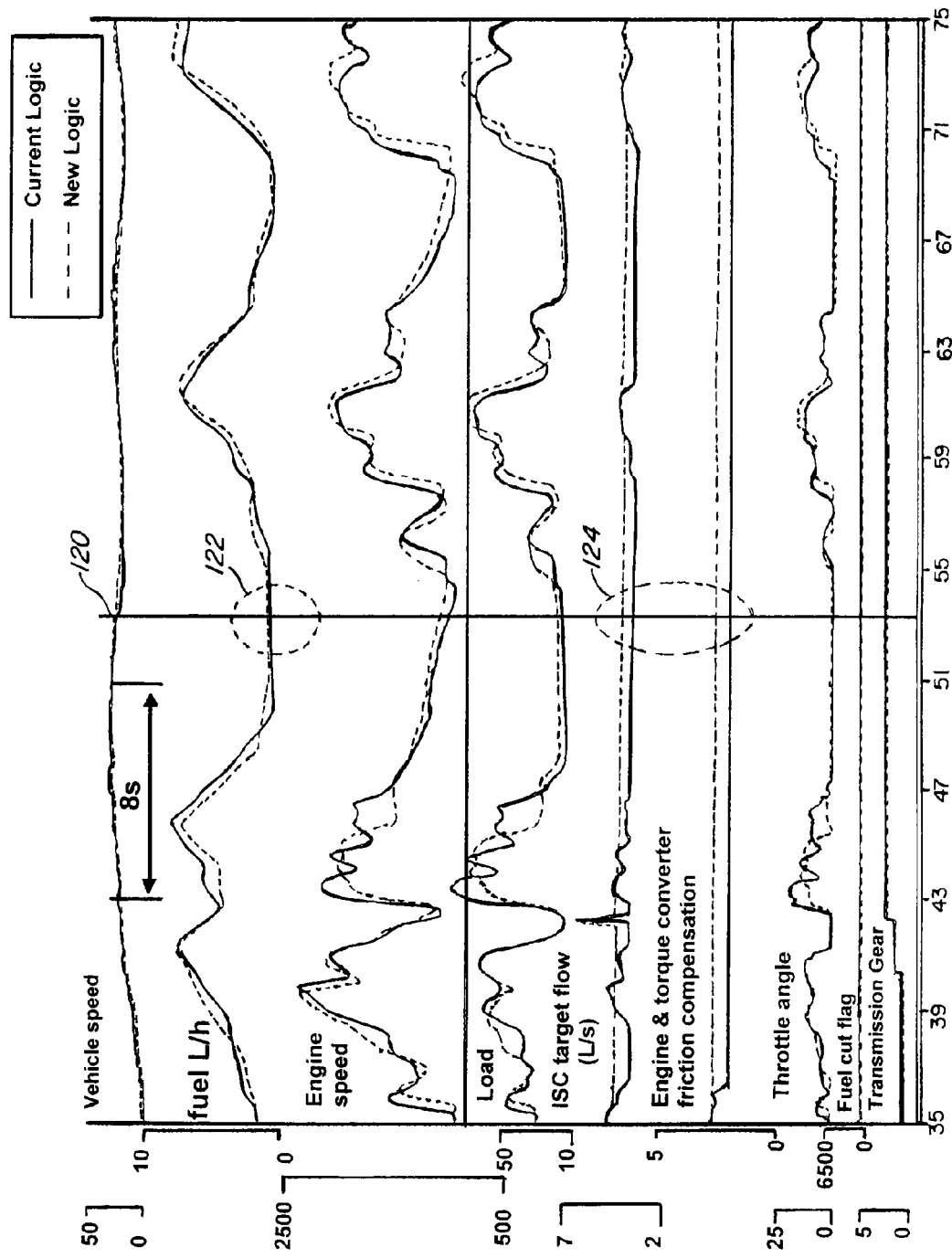
FIG. 7 is a graph of various automobile parameters for sample tests according to an embodiment of the present invention.

The benefits of determining the target total airflow for a target idle engine speed using the engine output speed, the transmission input speed, and/or the torque converter speed ratio can be seen, for example, in FIGS. 5, 6, and 7. FIG. 5 depicts, for example, expected fuel efficiency and actual fuel efficiency using various types of calculations for various Federal Test Procedures ("FTP") such as FTP75 Bag 1, FTP75 Bag 2, FTP75 Bag 3, and FTP75 Combined. FIG. 6 depicts, for example, the data used for the actual fuel efficiency.

FIG. 7 also depicts actual improvements in fuel efficiency. In FIG. 7, the vehicle speed, the fuel consumed in liters per hour, the engine speed, the hydrodynamic load, the idle speed control target flow in liters per second, the engine and torque converter friction compensation, the throttle angle for driving, the fuel cut flag, and the transmission gear for the transmission 110 is shown.

In FIG. 7, the fuel efficiency can be seen, for example, at a time represented by a line 120 and in the fuel consumed in liters per hour graph, the idle speed control target flow in liters per second graph, and/or the engine and torque converter friction compensation graph. In FIG. 7, at the time represented by the line 120, the fuel consumed per hour dropped from 1.29 L/h to 0.97 L/h as shown by a region 122. The airflow consumed also dropped as shown in a region 124. For example, the idle speed control target flow, or the total airflow ($Q_{TOTAL}$), dropped from 4.3 L/s to 3.5 L/s while the airflow used to compensate for the engine and torque converter friction ($Q_{TC}$) dropped from 2.6 L/s to 1.8 L/s.

Figure 8:
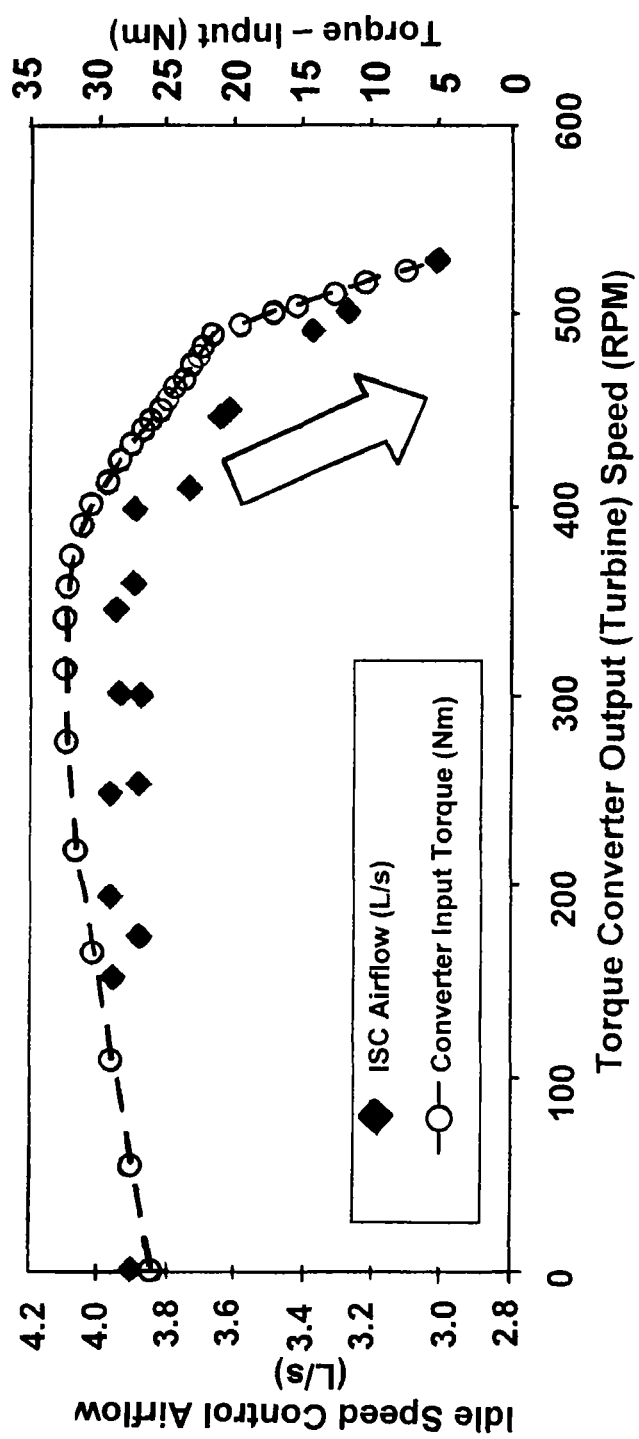
FIG. 8 is a graph of airflow, torque converter input torque, and torque converter output speed according to an embodiment of the present invention.

The control of the target total airflow can be seen, for example, in FIG. 8. As seen in FIG. 8 as the torque converter output speed or the transmission input speed increases, the torque converter input speed or the engine output speed can be decreased. This results in the idle speed control airflow or the target total airflow being decreased.

Figure 9:
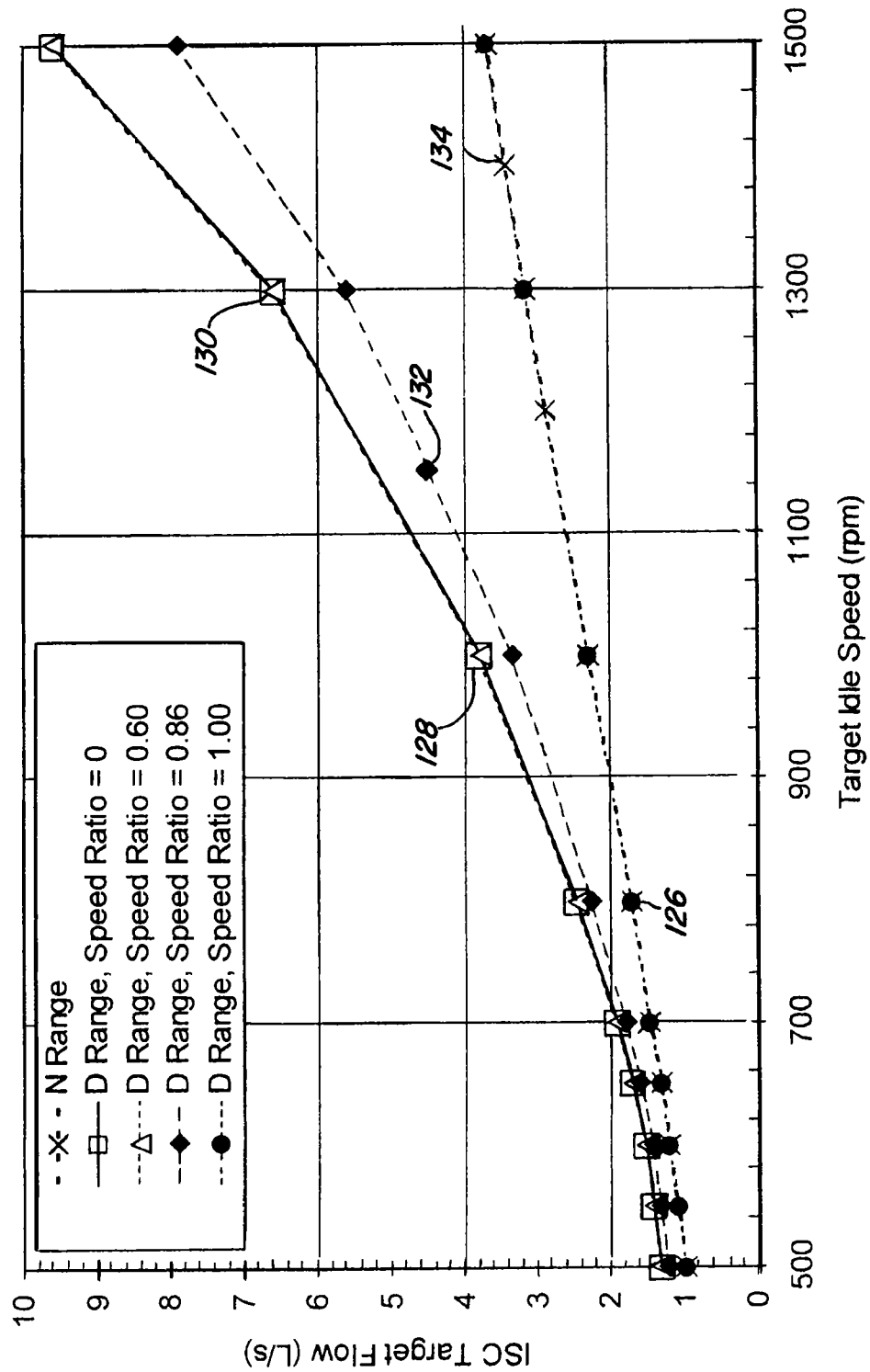
FIG. 9 is a graph of airflow and target idle speed according to an embodiment of the present invention.

FIG. 9 depicts, for example, a graph of the idle speed control ("ISC") target flow over the target idle speed. The idle speed control target flow can be, for example, the total target airflow. In the neutral range, the transmission 110 is disengaged from the torque converter 108, resulting in little hydrodynamic load. The ISC flow for neutral range is depicted, for example, by curve 126. The ISC flow for D range (driving) with a torque converter speed ratio of 0 is represented for example by a curve 128. The ISC flow for D range (driving) with a torque converter speed ratio of 0.60 is represented for example by a curve 130. The ISC flow for D range (driving) with a torque converter speed ratio of 0.86 is represented for example by a curve 132. The ISC flow for D range (driving) with a torque converter speed ratio of 1.00 is represented for example by a curve 134. In one embodiment, a torque converter speed ratio of greater than 1.00 can also be represented by the curve 134.

As can be seen, when the torque converter speed ratio is 1.00, there is little hydrodynamic load and thus, the curve 134 matches the curve 126 and a reduced amount of airflow is required for the engine 106. Likewise, the airflow required for the engine 106 when the torque converter speed ratio=0 and the torque converter speed ratio=0.60 can be equivalent to each other as seen by the curve 128 and the curve 130. As indicated by the curve 132, as the torque converter speed ratio increases, the amount of air required decreases and thus the curve representing the ISC target flow moves from the curve 128 or the curve 130 towards the curve 126 or the curve 134.

Figure 10:
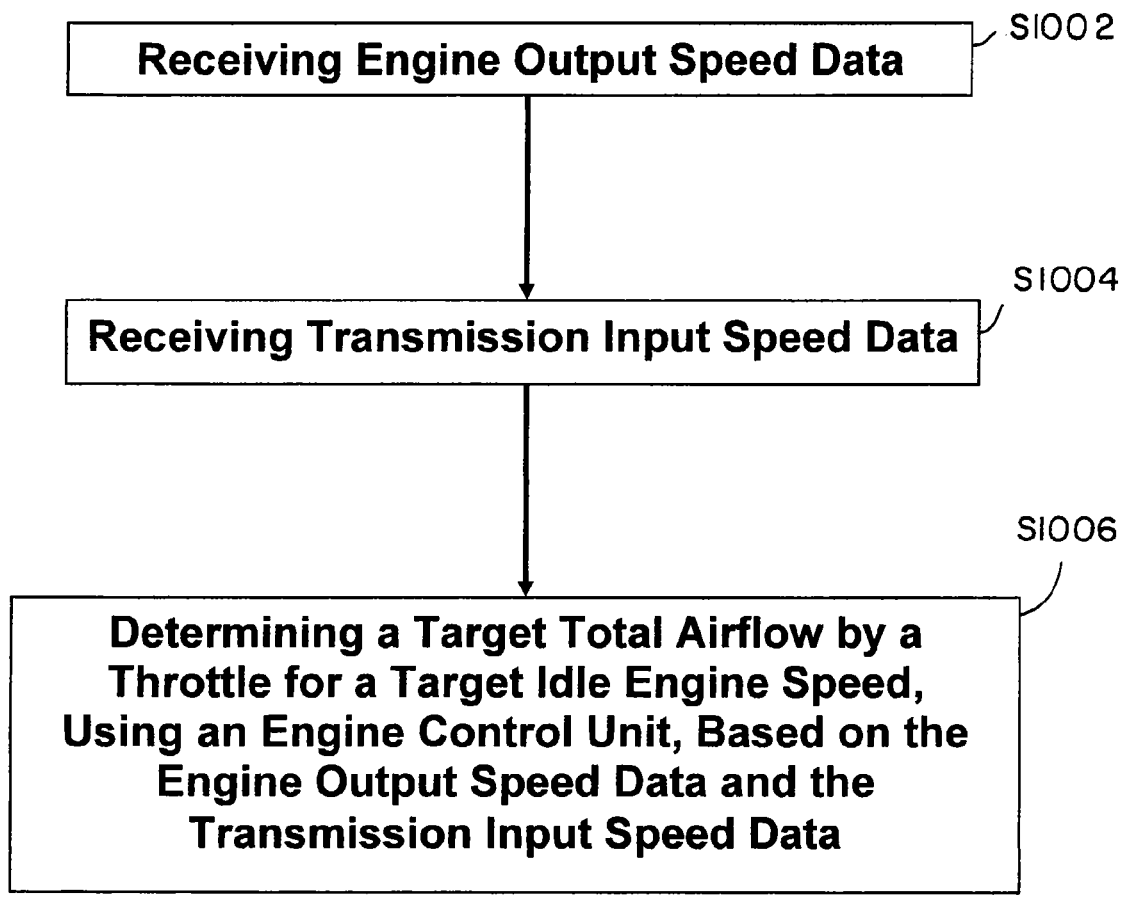
FIG. 10 depicts a process according to an embodiment of the present invention.

In one embodiment, the present invention can be a process as shown in FIG. 10. In Step S1002, engine output speed data is received. For example, the ECU 116 can receive the engine output speed data from the sensor 112. In Step S1004, transmission input speed data is received. For example, the ECU 116 can receive the transmission input speed data from the sensor 114.

In Step S1006, a target total airflow is determined for a throttle for a target idle engine speed, using an engine control unit. The target total airflow can be determined based on the engine output speed data and the transmission input speed data. For example, the ECU 116 can determine the target total airflow for the throttle 104 for a target idle engine speed. The ECU 116 can use the target total airflow table to determine the target total airflow using the engine output speed data, and/or the transmission input speed data. Optionally, the ECU 116 can use the target total airflow table to determine the target total airflow using the torque converter speed ratio.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An idle throttle variation unit for an automobile comprising:
    an engine having an engine output speed;
    an engine sensor configured to measure the engine output speed and to generate engine output speed data corresponding to the measured engine output speed;
    a torque converter coupled to the engine;
    a transmission coupled to the torque converter and having a transmission input speed;
    a transmission sensor configured to measure the transmission input speed and to generate transmission input speed data corresponding to the transmission input speed;
    a throttle coupled to the engine and configured to output an airflow to the engine during a current idle operation of the engine;
    a memory configured to store throttle airflow compensation values for torque converter loads corresponding to torque converter speed ratio values for an idle operation of the engine; and
    an engine control unit coupled to at least the engine sensor, the transmission sensor, and the memory, the engine control unit configured to:
        determine a torque converter speed ratio based on the engine output speed data and the transmission input speed data,
        determine a total target throttle airflow for the current idle operation of the engine based on the determined torque converter speed ratio and the stored throttle airflow compensation values for the torque converter loads, and
        control the airflow outputted by the throttle to the engine during the current idle operation of the engine based on the determined total target throttle airflow.

2. The idle throttle variation unit of claim 1 wherein the torque converter includes an impeller having an impeller rotation speed, and the impeller is coupled to the engine such that the engine output speed corresponds to the impeller rotation speed.

3. The idle throttle variation unit of claim 2 wherein the torque converter includes a turbine having a turbine rotation speed, and the transmission is coupled to the turbine such that the transmission input speed corresponds to the turbine rotation speed.

4. The idle throttle variation unit of claim 1 wherein the throttle airflow compensation values for the torque converter loads optimize fuel efficiency of the automobile during the current idle operation of the engine based on at least one of the stored throttle airflow compensation value corresponding to the determined torque converter speed ratio.

5. The idle throttle variation unit of claim 4 wherein the memory is further configured to store a target throttle airflow table having the stored throttle airflow compensation values for the torque converter loads, and wherein the engine control unit is further configured to utilize the target throttle airflow table to determine the total target throttle airflow based on the determined torque converter speed ratio and the stored throttle airflow compensation values.

6. The idle throttle variation unit of claim 1 wherein the engine control unit is further configured to:
   determine a throttle airflow compensation for a torque converter load of the torque converter based on the determined torque converter speed ratio and the stored throttle airflow compensation values,
   determine a throttle airflow compensation for an electronic device of the automobile, and
   determine the total target throttle airflow for the current idle operation of the engine based on the determined throttle airflow compensation for the torque converter load and the determined throttle airflow compensation for the electronic device.

7. The idle throttle variation unit of claim 1 wherein the engine control unit is further configured to control the throttle using an algorithm stored in the memory.

8. The idle throttle variation unit of claim 7 wherein the engine control unit is further configured to control the throttle such that the airflow outputted by the throttle to the engine during the current idle operation of the engine matches the determined total target throttle airflow.

9. An automobile comprising:
   an engine having an engine output speed;
   an engine sensor configured to measure the engine output speed and to generate engine output speed data corresponding to the measured engine output speed;
   a transmission having a transmission input speed;
   a transmission sensor configured to measure the transmission input speed and to generate transmission input speed data corresponding to the transmission input speed;
   a memory configured to store throttle airflow compensation values for torque converter loads corresponding to output speed values and transmission input speed values for an idle operation of the engine;
   an engine control unit configured to:
      receive the engine output speed data and the transmission input speed data, and
      determine a total target throttle airflow by the throttle for a target idle engine speed during a current idle operation of the engine based on the received engine output speed data, the received transmission input speed data and the throttle airflow compensation values for the torque converter loads; and
   a throttle connected to the engine control unit and configured to output a total airflow to the engine during the current idle operation of the engine based on the determined total target throttle airflow.

10. The automobile of claim 9 wherein the memory is configured to store a total target throttle airflow table having the throttle airflow compensation values for the torque converter loads corresponding to the engine output speed values and the transmission input speed values, and wherein the engine control unit is further configured to utilize the total target throttle airflow table to determine the total target throttle airflow by the throttle.

11. The automobile of claim 9 wherein the throttle airflow compensation values for the torque converter loads optimize efficiency of the automobile during the current idle operation of the engine based on the corresponding output speed values and the transmission input speed values.

12. The automobile of claim 9 wherein the engine control unit is further configured to:
   determine a throttle airflow compensation for a torque converter load of the torque converter based on the received engine output speed data and the received transmission input speed data,
   determine a throttle airflow compensation for an electronic device of the automobile, and
   determine the total target throttle airflow by the throttle for the target idle engine speed during the current idle operation of the engine based on the throttle airflow compensation values for the torque converter loads, the determined throttle airflow compensation for torque converter load, and the determined throttle airflow compensation for the electronic device.

13. A method for idle throttle variation for an automobile, the method comprising:
   measuring, using an engine sensor, an engine output speed of an engine, and generating, using the engine sensor, engine output speed data corresponding to the measured engine output speed;
   measuring, using a transmission sensor, a transmission input speed of a transmission, and generating, using the transmission sensor, engine output speed data corresponding to the measured transmission input speed;
   receiving, using an engine control unit, the engine output speed data;
   receiving, using the engine control unit, the transmission input speed data;
   determining, using the engine control unit, a torque converter speed ratio based on the engine output speed data and the transmission input speed data;
   storing, in a memory, throttle airflow compensation values for torque converter loads during an idle operation of the engine corresponding to torque converter speed ratio values;
   determining, using the engine control unit, a total target throttle airflow for a target idle engine speed during a current idle operation of the engine based on at least one of the throttle airflow compensation values for the torque converter loads that correspond to the determined torque converter speed ratio; and
   controlling, using the engine control unit, an airflow outputted by a throttle to the engine during the current idle operation of the engine based on the determined total target throttle airflow.

14. The method of claim 13 wherein a total target throttle airflow table is stored in the memory, the total target throttle airflow table having the throttle airflow compensation values for the torque converter loads corresponding to the torque converter speed ratio values, the method further comprising utilizing, using the engine control unit, the total target throttle airflow table to determine the total target throttle airflow.

15. The method of claim 13 wherein the stored throttle airflow compensation values for the torque converter loads optimize efficiency of the automobile during the idle operation of the engine based on the corresponding torque converter speed ratio values.

16. The method of claim 13 further comprising:
   determining, using the engine control unit, a throttle airflow compensation for a torque converter load of the torque converter based on the stored throttle airflow compensation values for the torque converter loads and the determined torque converter speed ratio, determining, using the engine control unit, a throttle airflow compensation for an electronic device of the automobile, and determining, using the engine control unit, the total target throttle airflow for the target idle engine speed during the current idle operation of the engine based on the throttle airflow compensation for the torque converter load of the torque converter and the throttle airflow compensation for the electronic device of the automobile.

17. The method of claim 13 further comprising:
controlling the throttle, using an algorithm stored in the memory.

18. The method of claim 13 wherein the step of controlling, using the engine control unit, the airflow outputted by the throttle to the engine during the current idle operation of the engine is performed such that the airflow outputted by the throttle to the engine during the current idle operation of the engine matches the determined total target throttle airflow.

19. An idle throttle variation unit for an automobile comprising:
an air-conditioning unit;
an engine having an engine output speed and configured to power the air-conditioning unit;
an engine sensor configured to measure the engine output speed and to generate engine output speed data corresponding to the measured engine output speed;
a throttle coupled to the engine and configured to output an airflow to the engine during a current idle operation of the engine;
a torque converter coupled to the engine;
a transmission coupled to the torque converter and having a transmission input speed;
a transmission sensor configured to measure the transmission input speed and to generate transmission input speed data corresponding to the transmission input speed;
a memory configured to store throttle airflow compensation values for torque converter loads corresponding to torque converter speed ratio values for an idle operation of the engine; and
an engine control unit connected to at least the engine sensor, the throttle, the transmission sensor, and the memory, the engine control unit configured to:
determine a torque converter speed ratio based on the engine output speed data and the transmission input speed data,
determine a first target throttle airflow for the current idle operation of the engine based on the determined torque converter speed ratio and the stored throttle airflow compensation values for the torque converter loads,
determine a second target throttle airflow for powering the air-conditioning unit during the current idle operation of the engine,
determine a total target throttle airflow during the current idle operation of the engine based on the determined first target throttle airflow by the throttle and the second target throttle airflow by the throttle, and
control the airflow outputted by the throttle to the engine during the current idle operation of the engine based on the determined total target throttle airflow.

* * * * *